Aug. 7, 1956  J. B. BRENNAN  2,758,149
ELECTRIC DEVICE AND HERMETIC SEAL THEREFOR
Filed Dec. 20, 1952
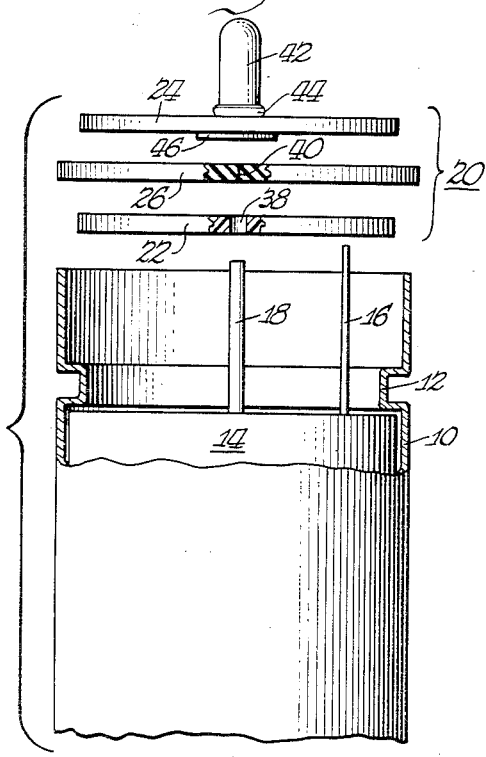
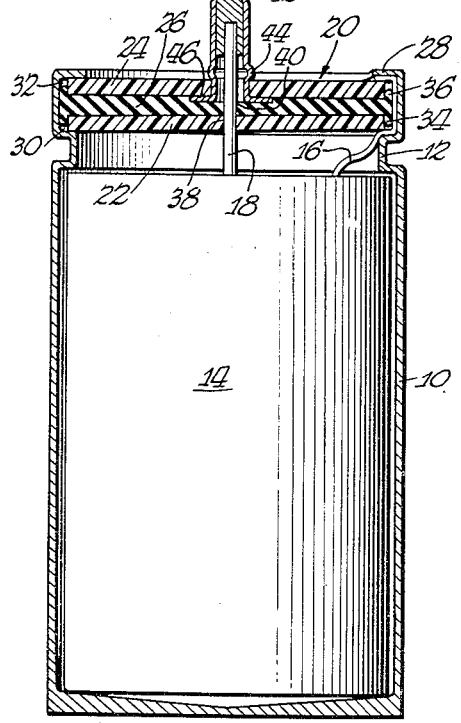
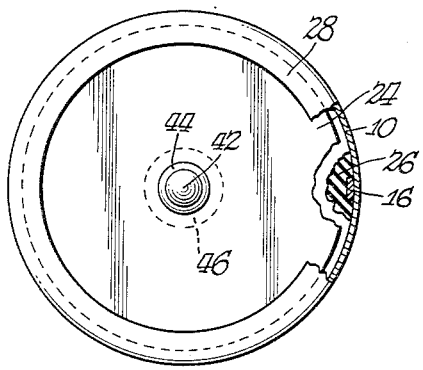
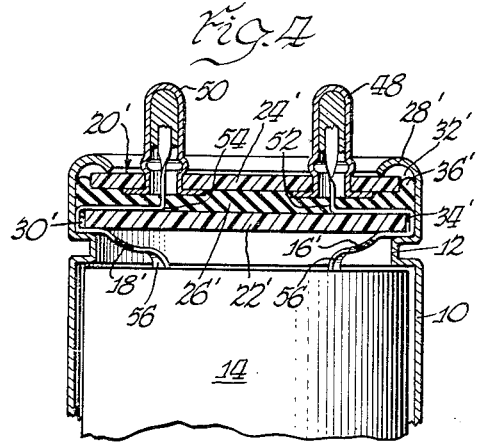
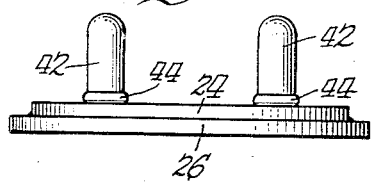
Inventor
Joseph B. Brennan
by Bair, Freeman & Molinare
Attys.

United States Patent Office 2,758,149
Patented Aug. 7, 1956

2,758,149

ELECTRIC DEVICE AND HERMETIC SEAL THEREFOR

Joseph B. Brennan, Cleveland, Ohio

Application December 20, 1952, Serial No. 327,129

12 Claims. (Cl. 174—50.5)

This invention relates to electric devices such as condensers and more particularly to an improved seal means for tightly and hermetically sealing the open end of the electric device or condenser.

One object of this invention is to improve the construction of electric condensers, particularly by the provision of better seals for the open ends thereof.

Another object of this invention is to provide an improved and simplified end seal for the open ends of electric condensers.

A further object of this invention is to provide an improved end seal for open ends of electric condensers, which end seal has rigid laminae and a resilient deformable lamina, and wherein means are provided for effecting a better seal around the edges of the rigid laminae of said end seal.

Still another object of this invention is to provide an improved laminated end seal for open ends of can-type electric condensers, which end seal is composed of rigid and resilient laminae, wherein the possibility of jamming between the rigid lamina and the walls of the can during assembly is substantially eliminated.

Reference is made to the type of end closures shown and described in U. S. Patent No. 2,144,959 and to my co-pending application S. N. 139,243, filed January 18, 1950, now Patent No. 2,627,538, issued February 3, 1953, and over both of which disclosures the present invention is a decided improvement.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is a vertical cross-section view of a can-type electric condenser provided with the improved seal for the open end thereof;

Figure 2 is an enlarged exploded view showing the components of the end seal illustrated in Figure 1;

Figure 3 is a top plan view, with portions broken away, of the electric condenser shown in Figure 1;

Figure 4 is a fragmentary vertical cross-section view of the open end of an electric condenser provided with a modified form of the novel end seal; and Figure 5 is an elevation view showing a sub-assembly modification of the components of the novel end seal.

Referring now to the drawings, there is shown in Figure 1 a condenser can 10 made of metal, such as aluminum, and sealed at its lower end and initially open at the upper end thereof. The can 10 has an internally protruding shoulder 12 positioned adjacent the open upper end of the can. A condenser roll 14 is positioned in the lower portion of the can between the shoulder 12 and the sealed bottom of the can. The condenser roll 14 has flat terminals 16 and 18 extending therefrom. A seal, generally indicated at 20, is provided and is adapted to be inserted in the open end of can 10. This seal is laminated and consists of an inner rigid disc-like lamina 22, an outer rigid disc-like lamina 24, and a resilient deformable lamina 26 positioned between the inner and outer laminae 22 and 24.

The inner lamina 22 is adapted to engage the shoulder 12 when the seal 20 is in proper position in can 10. Means are provided to clamp the laminae together and to secure the seal in the open end of can 10, and such means may be the inwardly turned end 28 of can 10. The clamping of the seal 20 within the can 10 forces the laminated seal 20 against the shoulder 12 and thus the seal is maintained in position axially within the can 10.

The inner lamina 22 is made of smaller diameter than the inner diameter of can 10 and of larger diameter than shoulder 12. When the seal 20 is properly positioned, the edge of inner lamina 22 is spaced from can 10 to define an annular space 30. The outer lamina 24 is of no greater dimension than inner lamina 22 and, consequently, when seal 20 is correctly positioned within the can 10, the edge of upper lamina 24 is similarly spaced from can 10 to define an annular space 32.

The diameter of resilient deformable lamina 26 is greater than the inner diameter of can 10, and when the seal 20 is inserted into the can 10 this resilient lamina 26 engages the wall of the can to effect a seal therebetween, and, in addition, deforms so that portions of the resilient lamina 26 extend axially into spaces 30 and 32. As seen in Figure 1, the deformed portion 34 of the resilient lamina 26 has entered space 30, and the deformed portion 36 has entered space 32. The portions 34 and 36 serve to effect a better edge seal for the rigid laminae 22 and 24.

In the final assembly of the condenser shown in Figure 1, the terminal 16 of the condenser roll 14 is trained over the edge of inner lamina 22 and is positioned between resilient lamina 26 and the wall of the can 10; the resilient lamina 26 serving to force terminal 16 against the wall of can 10 in electrically conducting relation therewith. Thus, the wall of the can 10 itself may serve as one terminal for the condenser, as is well known. The other terminal 18 extends through an aperture 38 in lamina 22, then through slit 40 in resilient lamina 26, and is secured to a prong-type terminal 42 mounted centrally on outer lamina 24. The prong-type terminal 42 may be secured to lamina 24 by means of bead 44 and the flange 46 on terminal 42 located on opposite sides of lamina 24.

In the modification shown in Figure 4, the outer lamina 24' is of smaller diameter than inner lamina 22'. This makes space 32' greater than space 30' and permits a greater amount of the resilient material of resilient lamina 26' to be squeezed into space 32'. As shown in Figure 4, the portion 36' in space 32' is greater than the portion 34' in space 30'.

Additionally in the modification shown in Figure 4, the condenser roll leads do not extend past the edge of resilient lamina 26' and, therefore, the best seal possible is obtained between the edge of lamina 24' and the wall of can 10. As shown, both leads 16' and 18' are brought out centrally of can 10 and secured to prong-type terminals 48 and 50 mounted on outer lamina 24'. If desired, both terminals 16' and 18' may be brought through the inner lamina 22, then through resilient lamina 26', and then be secured to the prong-type terminals in the manner shown for terminal 18 in Figure 1. However, in an effort to avoid forming an aperture in lamina 22 and also to provide a better seal, both terminals 16' and 18' may be brought around the edge of lamina 22', then run between lamina 22' and resilient lamina 26', then passed through slits 52 and 54 in resilient lamina 26', and then be secured in electrically conducting relation with the prong-type terminals 48 and 50, as shown. To avoid electrical conduction between the terminals and can 10, either or both terminals may be coated with a layer of insulation 56. Such insulation may be applied to the terminals after the condenser roll 14 has been prepared for the can 10.

The arrangement shown in Figure 4 is particularly desirable in the sealing of the condenser because the only place where air-leakage may occur through resilient lamina 26' is through slits 52 and 54. However, the compression of the resilient lamina by the clamping of the rigid lamina and resilient lamina together causes an excellent seal at these slits and substantially prevents all leakage. Additionally, there is an improved seal between the edge of the outer lamina 24' and the wall of can 10, and between the lamina 24' and the resilient lamina 26', all of which cooperates to prevent leakage of air through the seal 20'.

In preparing the various lamina for assembly of seal 20, it is desirable to bond the resilient lamina 26 to one or both of the rigid laminae 22 or 24, so as to insure centering of the laminae in the assembly of seal 20 within can 10, and also to simplify the assembly and also to provide for better sealing between the laminae. Accordingly, in Figure 5 there is shown a sub-assembly of seal 20 consisting of resilient lamina 26 and rigid lamina 24 bonded together and adapted to be manipulated as a unit in the assembly of the seal within the condenser can 10.

While there has been shown and described a particular embodiment of this invention, it will be obvious to those skilled in the art that various changes and modifications may be made without departing from the invention, and, therefore, it is intended in the appended claims to cover all such changes and modifications as fall within the true spirit and scope of the invention.

What I claim as new, and desire to secure by Letters Patent of the United States, is:

1. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member comprising relatively rigid inner and outer laminae of dielectric material and a resilient lamina between said rigid laminae, the inner resilient lamina being of smaller dimension than the internal dimension of said can and of greater dimension than the internal dimension of said shoulder, said inner lamina adapted to be clamped against said internal shoulder with the edge of said inner lamina spaced from the wall of the can, said outer lamina being of dimension no greater than the dimension of said inner lamina, said resilient lamina when undistorted being of greater dimension than the internal dimension of the can, means clamping said laminated sealing member against said shoulder, and the excess of material of said resilient lamina being forced axially of said resilient lamina into the spaces between said rigid lamina and the wall of the can whereby an improved hermetic seal is obtained.

2. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member comprising relatively rigid inner and outer laminae of dielectric material and a resilient lamina between said rigid laminae, the inner lamina being of smaller dimension than the internal dimension of said can and of greater dimension than the internal dimension of said shoulder, said inner lamina adapted to be clamped against said internal shoulder with the edge of said inner lamina spaced from the wall of the can, said outer lamina being of smaller dimension than said inner lamina, whereby the edge of said outer lamina is spaced further from the wall of the can than is the edge of the inner lamina, said resilient lamina when undistorted being of greater dimension than the internal dimension of the can, means clamping said laminated sealing member against said shoulder, and the excess of material of said resilient lamina being forced axially of said resilient lamina into the spaces between said rigid lamina and the wall of the can whereby an improved hermetic seal is obtained, a greater amount of said resilient material entering the space between the outer lamina and the can than that entering the space between said inner lamina and the can.

3. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member comprising relatively rigid inner and outer laminae of dielectric material and a resilient lamina between said rigid laminae, the inner lamina being of smaller dimension than the internal dimension of said can and of greater dimension than the internal dimension of said shoulder, said inner lamina adapted to be clamped against said internal shoulder with the edge of said inner lamina spaced from the wall of the can, said outer lamina being of dimension no greater than the dimension of said inner lamina, said resilient lamina when undistorted being of greater dimension than the internal dimension of the can, means clamping said laminated sealing member against said shoulder, and the excess of material of said resilient lamina being forced axially of said resilient lamina into the spaces between said rigid lamina and the wall of the can whereby an improved hermetic seal is obtained, and at least one electric terminal mounted on said outer lamina centrally of said can to which one of said leads is connected.

4. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member comprising relatively rigid inner and outer laminae of dielectric material and a resilient lamina between said rigid laminae, the inner lamina being of smaller dimension than the internal dimension of said can and of greater dimension than the internal dimension of said shoulder, said inner lamina adapted to be clamped against said internal shoulder with the edge of said inner lamina spaced from the wall of the can, said outer lamina being of dimension no greater than the dimension of said inner lamina, said resilient lamina when undistorted being of greater dimension than the internal dimension of the can, means clamping said laminated sealing member against said shoulder, and the excess of material of said resilient lamina being forced axially of said resilient lamina into the spaces between said rigid lamina and the wall of the can whereby an improved hermetic seal is obtained, and a pair of prong-type electric terminals mounted on said outer lamina and extending therefrom, to which said leads are connected.

5. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member comprising relatively rigid inner and outer laminae of dielectric material and a resilient lamina between said rigid laminae, the inner lamina being of smaller dimension than the internal dimension of said can and of greater dimension than the internal dimension of said shoulder, said inner lamina adapted to be clamped against said internal shoulder with the edge of said inner lamina spaced from the wall of the can, said outer lamina being of dimension no greater than the dimension of said inner lamina, said resilient lamina when undistorted being of greater dimension than the internal dimension of the can, means clamping said laminated sealing member against said shoulder, and the excess of material of said resilient lamina being forced axially of said resilient lamina into the spaces between said rigid lamina and the wall of the can whereby an improved hermetic seal is obtained, and said resilient lamina being bonded to at least one of said rigid laminae.

6. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member comprising relatively rigid inner and outer laminae of dielectric material and a resilient lamina between said rigid laminae, the inner lamina being of smaller dimension than the internal dimension of said can and of greater dimension than the internal dimension of said shoulder, said inner lamina adapted to be clamped against said internal shoulder with the edge of said inner lamina spaced from the wall of the can, said outer lamina being of dimension no greater than the dimension of said inner lamina, said resilient lamina when undistorted being of greater dimension than the internal dimension of the can, means clamping said laminated sealing member against said shoulder, and the excess of material of said resilient lamina being forced axially of said resilient lamina into the spaces between said rigid lamina and the wall of the can whereby an improved hermetic seal is obtained, and said resilient lamina being bonded to the outer lamina to form a unitary member therewith.

7. In a hermetically sealed electric device, a can having an open end with an internal shoulder, of smaller internal dimension than the open end of the can formed near said open end, an electrical device within said can, a pair of leads for said electrical device adapted to be connected to electric terminals located exteriorly of said can, a laminated sealing member comprising relatively rigid inner and outer laminae of dielectric material and a resilient lamina between said rigid laminae, the inner lamina being of smaller dimension than the internal dimension of said can and of greater dimension than the internal dimension of said shoulder, said inner lamina adapted to be clamped against said internal shoulder with the edge of said inner lamina spaced from the wall of the can, said outer lamina being of dimension no greater than the dimension of said inner lamina, said resilient lamina when undistorted being of greater dimension than the internal dimension of the can, means clamping said laminated sealing member against said shoulder, and the excess of material of said resilient lamina being forced axially of said resilient lamina into the spaces between said rigid lamina and the wall of the can whereby an improved hermetic seal is obtained, and said resilient lamina being aligned coaxially with said outer rigid lamina and being bonded thereto, whereby said coaxial relationship is always maintained.

8. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member comprising relatively rigid inner and outer laminae of dielectric material and a resilient lamina between said rigid laminae, the inner lamina being of smaller dimension than the internal dimension of said can and of greater dimension than the internal dimension of said shoulder, said inner lamina adapted to be clamped against said internal shoulder with the edge of said inner lamina spaced from the wall of the can, said outer lamina being of dimension no greater than the dimension of said inner lamina, said resilient lamina when undistorted being of greater dimension than the internal dimension of the can, means clamping said laminated sealing member against said shoulder, and the excess of material of said resilient lamina being formed axially of said resilient lamina into the spaces between said rigid lamina and the wall of the can whereby an improved hermetic seal is obtained, said means clamping the laminated sealing member against said shoulder including an inwardly turned portion of the can at the open end thereof engaging the outer rigid lamina of said laminated sealing member.

9. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member insertable in the open end of said can, said laminated sealing member comprising relatively rigid inner and outer laminae of dielectric material, and a resilient lamina between said rigid laminae, said inner lamina being of smaller dimension than the internal dimension of said can, and of greater dimension than the internal dimension of said shoulder, said inner lamina being imperforate, said outer lamina being of dimension no greater than the dimension of said inner lamina, said resilient lamina when undistorted being of greater dimension than the internal dimension of the can, means clamping said laminated sealing member against said shoulder, the excess of material of said resilient lamina being forced axially of said resilient lamina into the spaces between the edges of said rigid laminae and the wall of the can, means insulating at least one of said leads from the wall of said can, both of said condenser leads being trained over the edge of said inner lamina, said insulated lead then extending inwardly from the edge of said inner lamina and running between said resilient lamina and said rigid inner lamina to a slit in said resilient lamina through which said insulated lead extends, said slit being located substantially centrally of said resilient lamina, and an electric terminal mounted on said outer lamina substantially centrally of said can to which said insulated lead is electrically connected.

10. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member insertable in the open end of said can, said laminated sealing member comprising relatively rigid inner and outer laminae of dielectric material, and a resilient lamina between said rigid laminae, said inner lamina being of smaller dimension than the internal dimension of said can, and of greater dimension than the internal dimension of said shoulder, said inner lamina being imperforate, said outer lamina being of dimension no greater than the dimension of said inner lamina, said resilient lamina when undistorted being of greater dimension than the internal dimension of the can, means clamping said laminated sealing member against said shoulder, the excess of material of said resilient lamina being forced axially of said resilient lamina into the spaces between the edges of said rigid laminae and the wall of the can, means insulating at least one of said leads from the wall of said can, both of said leads being trained over the edge of said inner lamina, said leads then extending inwardly from the edge of said inner lamina and running between said resilient lamina and said rigid inner lamina to slits in said resilient lamina through which said leads extend, and a pair of prong-type electric terminals mounted on said outer lamina and extending therefrom, to which said leads are electrically connected.

11. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member insertable in the open end of said can, said laminated sealing member comprising relatively rigid inner and outer laminae, of dielectric material, and a resilient lamina between said rigid laminae, said inner lamina being of smaller dimension than the internal dimension of said can and of greater dimension than the internal dimension of said shoulder, said inner lamina being imperforate, said outer lamina being of dimension no greater than the dimension of said inner lamina, said resilient lamina when undistorted being of greater dimension than the internal dimension of the can, means clamping said laminated sealing member against said shoulder, the excess of material of said resilient lamina being forced axially of said resilient lamina into the spaces between the edges of said rigid laminae and the wall of the can, both of said leads being trained over the edge of said inner lamina, means insulating both said leads from the wall of said can, said insulated leads then extending inwardly from the edge of said inner lamina and running between said resilient lamina and said rigid inner lamina to slits in said resilient lamina through which said insulated leads extend, and a pair of prong-type electric terminals mounted on said outer lamina and extending therefrom, to which said leads are electrically connected.

12. In a hermetically sealed electric device, a can having an open end with an internal shoulder, of smaller internal dimension than the open end of the can, formed near said open end, an electrical device within said can, a pair of leads for said electrical device adapted to be connected to electric terminals located exteriorly of said can, a laminated sealing member insertable in the open end of said can, said laminated sealing member comprising relatively rigid inner and outer laminae of dielectric material, and a resilient lamina between said rigid laminae, said inner lamina being of smaller dimension than the internal dimension of said can and of greater dimension than the internal dimension of said shoulder, said inner lamina being imperforate, said outer lamina being of smaller dimension than said inner lamina, whereby the edge of said outer lamina is spaced further from the wall of the can than is the edge of the inner lamina, said resilient lamina when undistorted being of greater dimension than the internal dimension of the can, means clamping said laminated sealing member against said shoulder, the excess of material of said resilient lamina being forced axially of said resilient lamina into the spaces between the edges of said rigid laminae and the wall of the can, a greater amount of resilient material entering the space between the outer lamina and the can than that entering the space between said inner lamina and the can, at least one of said leads being insulated from the wall of said can, both of said leads being trained over the edge of said inner lamina, said insulated lead then extending inwardly from the edge of said inner lamina and running between said resilient lamina and said rigid inner lamina to a slit in said resilient lamina through which said insulated lead extends, and an electric terminal mounted on said outer lamina and extending therefrom, to which said insulated lead is electrically connected.

References Cited in the file of this patent

UNITED STATES PATENTS

| | | |
|---|---|---|
| 922,544 | Turner | May 25, 1909 |
| 2,144,959 | Blackburn | Jan. 24, 1939 |
| 2,202,166 | Peck | May 28, 1940 |
| 2,246,933 | Deeley | June 24, 1941 |
| 2,442,964 | Simonsen | June 8, 1948 |
| 2,665,329 | Brennan | Jan. 5, 1954 |

FOREIGN PATENTS

| | | |
|---|---|---|
| 587,289 | Great Britain | Apr. 21, 1947 |